US012378812B1

(12) United States Patent
Bruchu et al.

(10) Patent No.: US 12,378,812 B1
(45) Date of Patent: Aug. 5, 2025

(54) GLASS LITE RETENTION SYSTEMS AND METHODS FOR IMPROVED PERFORMANCE

(71) Applicant: ANDERSEN CORPORATION, Bayport, MN (US)

(72) Inventors: Todd Bruchu, Lake Elmo, MN (US); Mitch Hunt, Oak Park Heights, MN (US); Craig Johnson, North Oaks, MN (US); Drew Pavlacky, Lakeland Shores, MN (US)

(73) Assignee: Andersen Corporation, Bayport, MN (US)

( * ) Notice: Subject to any disclaimer, the term of this patent is extended or adjusted under 35 U.S.C. 154(b) by 289 days.

(21) Appl. No.: 18/110,503

(22) Filed: Feb. 16, 2023

Related U.S. Application Data

(60) Provisional application No. 63/311,666, filed on Feb. 18, 2022.

(51) Int. Cl.
*E06B 3/54* (2006.01)
*E06B 7/02* (2006.01)

(52) U.S. Cl.
CPC ................ *E06B 3/549* (2013.01); *E06B 7/02* (2013.01)

(58) Field of Classification Search
CPC ................................... E06B 3/549; E06B 7/02
See application file for complete search history.

(56) References Cited

U.S. PATENT DOCUMENTS

| | | | | |
|---|---|---|---|---|
| 3,636,660 A * | 1/1972 | Peterson | E06B 7/10 49/408 |
| 5,636,484 A | 6/1997 | DeBlock | |
| 6,357,186 B1 * | 3/2002 | Gould | E06B 7/10 52/209 |
| 6,374,557 B1 * | 4/2002 | O'Donnell | E06B 7/14 49/408 |
| 6,729,095 B2 | 5/2004 | Wang Chen | |
| 8,033,056 B2 * | 10/2011 | Wernlund | E06B 1/70 49/408 |
| 8,434,284 B1 * | 5/2013 | Plummer | E06B 3/5892 52/745.16 |
| 8,739,481 B2 * | 6/2014 | Kim | E06B 7/22 52/204.6 |
| 9,163,449 B2 | 10/2015 | Weiss | |
| 9,181,428 B2 | 11/2015 | Vyakaranam | |
| 9,255,439 B2 * | 2/2016 | Goossens | E06B 3/5892 |
| 9,388,626 B2 * | 7/2016 | Gilbert | E06B 1/70 |
| 9,624,714 B2 | 4/2017 | Gouge | |
| 9,863,183 B2 * | 1/2018 | Johnson | E06B 7/14 |
| 10,641,035 B1 | 5/2020 | Weber | |
| 10,934,384 B1 | 3/2021 | Robinson | |
| 10,934,385 B1 | 3/2021 | Robinson | |
| 10,968,683 B2 | 4/2021 | Wang | |
| 11,053,367 B2 | 7/2021 | Hayashi | |
| 11,680,441 B2 * | 6/2023 | Franson | E06B 3/5814 52/203 |
| 11,933,102 B1 * | 3/2024 | Gingold | E06B 3/66342 |

(Continued)

*Primary Examiner* — Rodney Mintz
(74) *Attorney, Agent, or Firm* — Mueting Raasch Group

(57) ABSTRACT

Glass lite retention systems and related methods are described herein. The glass lite retention systems and methods of resisting water penetration through the junctions between the glass lites and the openings in the fenestration panels when the fenestration panels are subjected to extreme weather events.

22 Claims, 6 Drawing Sheets

(56) References Cited

U.S. PATENT DOCUMENTS

| | | | | |
|---|---|---|---|---|
| 11,952,835 | B2 * | 4/2024 | Anderson | E06B 7/14 |
| 2002/0092254 | A1 * | 7/2002 | Wang Chen | E06B 3/725 52/455 |
| 2009/0199486 | A1 * | 8/2009 | Wernlund | E06B 1/70 49/471 |
| 2013/0000232 | A1 * | 1/2013 | Weiss | B32B 17/10055 52/656.1 |
| 2013/0276376 | A1 * | 10/2013 | Gilbert | E06B 7/28 49/504 |
| 2013/0340363 | A1 * | 12/2013 | Kim | E06B 3/4636 49/420 |
| 2014/0259525 | A1 * | 9/2014 | Karl | E06B 3/5892 49/506 |
| 2015/0159428 | A1 * | 6/2015 | Johnson | E06B 7/14 49/471 |
| 2017/0022749 | A1 * | 1/2017 | Gouge | E06B 3/6621 |
| 2019/0055774 | A1 * | 2/2019 | Wang | E06B 3/549 |
| 2021/0238917 | A1 * | 8/2021 | Anderson | E06B 7/10 |
| 2022/0112762 | A1 * | 4/2022 | Franson | E06B 3/5814 |
| 2023/0028153 | A1 * | 1/2023 | Lovász | E06B 3/50 |
| 2023/0358092 | A1 * | 11/2023 | Montz | E06B 7/06 |
| 2024/0318433 | A1 * | 9/2024 | Rauh | E04D 13/031 |

* cited by examiner

GLASS LITE RETENTION SYSTEMS AND METHODS FOR IMPROVED PERFORMANCE

RELATED APPLICATION

This application claims the benefit under 35 U.S.C. Section 119 of U.S. Provisional Patent Application Ser. No. 63/311,666 entitled "GLASS LITE RETENTION SYSTEMS AND METHODS FOR IMPROVED PERFORMANCE" and filed on Feb. 18, 2022, which is incorporated herein by reference in its entirety.

Glass lite retention systems and methods are described herein.

BACKGROUND

Glass lites are commonly retained in fenestration panels (such as, e.g., door panels). When the fenestration panels are subjected to extreme weather events, wind and water can impinge on exterior facing sides of the fenestration panels.

SUMMARY

Glass lite retention systems and methods are described herein. The glass lite retention systems and methods are configured to resist water penetration through the junctions between the glass lites and the openings in the fenestration panels when the fenestration panels are subjected to extreme weather events.

In one or more embodiments, the glass lite retention systems and methods include a vent located on one side of the frame used to retain the glass lite in an opening in a fenestration panel and airtight seals formed between the glass lite and frame and the glass lite and the panel surrounding the opening in which the glass lite is located. It may be preferred that the side of the frame including the vent be located on the side of the fenestration panel exposed to higher pressures and/or moisture such as, e.g., wind and rain during extreme weather events, etc.

Although in typical installations, the side of the fenestration panel exposed to high pressure and moisture is the exterior side of the fenestration panel, the glass lite retention systems and methods described herein may be useful in any installation in which one side of a fenestration panel experiences higher pressure and moisture than the opposite side of the fenestration panel such as, e.g., car washes, containment rooms/buildings (in which a negative pressure is maintained to prevent escape of airborne materials/gasses) in humid or wet environments, etc. As a result, the fenestration panels may be described as having a high pressure/exterior side and a lower pressure/interior side.

Although not wishing to be bound by theory, in one or more embodiments of the glass lite retention systems and methods described herein, providing an airtight seal on a lower pressure/interior side of a fenestration panel and glass lite while providing a vented connection between a frame retaining a glass lite in a fenestration panel opening on a higher pressure/exterior side of the fenestration unit may limit water infiltration around the glass lite by providing improved control over the pressure differentials experienced in the junction between the glass lite and the fenestration panel opening.

In particular, providing a vented interface on higher pressure/exterior side of a glass lite retention system while providing an airtight seal on a lower pressure/interior side of the glass lite retention system allows for an equalization of pressure within the interface between the glass lite and the fenestration panel with the ambient atmosphere on the higher pressure/exterior side of the fenestration panel.

In other words, when the higher pressure/exterior side of the fenestration panel is subjected to higher pressure due to, e.g., wind, etc. that pressure is communicated into the interface between the glass lite and the fenestration panel opening. That high pressure is, however, not communicated through the interface between the glass lite retention system and the glass lite/fenestration panel on the lower pressure/interior side of the fenestration panel due to the airtight seal on the lower pressure/interior side of the glass lite retention system. In conventional constructions in which airtight seals are not provided on the lower pressure/interior sides of the fenestration panels and the exterior seals allow for the passage of water into the opening in which a glass lite is located, the lower ambient pressure on the lower pressure/interior side of the fenestration panel may tend to draw water through the glass lite retention system to the lower pressure/interior side of the fenestration panel.

Although manufacturers may provide fenestration panels with glass lites retained by glass lite retention systems that provide an airtight seal on the higher pressure/exterior side of the fenestration panel when new, the airtight seal may be compromised over time due to a variety of environmental and other factors. Once the seal on the higher pressure/exterior side of the fenestration panel is compromised, water entering the glass lite opening through the formerly airtight seal can be drawn through the glass lite opening to the lower pressure/interior side of the fenestration panel by the pressure differential.

As a result, providing a vented interface on a higher pressure/exterior side of a glass lite retention system while providing an airtight seal on a lower pressure/interior side of the glass lite retention system limits the amount of water drawn into the interface between the glass lite and the fenestration panel opening while also allowing for any water that may enter the interface between the glass lite and the fenestration panel opening to pass out of the interface through the one or more vents. Moreover, the environmental factors that can, over time, degrade airtight seals on the higher pressure/exterior sides of glass lite retention systems are, in normal use, not present on the lower pressure/interior sides of the glass lite retention systems, thereby resulting in much more robust and enduring water management by the glass lite retention systems described herein.

In a first aspect, one or more embodiments of the glass lite retention systems described herein include: a fenestration panel comprising an opening formed through the fenestration panel, the opening extending through the fenestration panel from a first major side of the fenestration panel to a second major side of the fenestration panel, the opening comprising an opening perimeter defining a shape of the opening; a glass lite positioned in the opening; a first frame positioned on the first major side of the fenestration panel, the first frame comprising one or more first frame members defining a shape of the first frame, wherein the first frame is positioned over a junction between a lite perimeter of the glass lite and the opening perimeter on the first major side of the fenestration panel; and a second frame positioned on the second major side of the fenestration panel, the second frame comprising one or more second frame members defining a shape of the second frame, wherein the second frame is positioned over the junction between the lite perimeter and the opening perimeter on the second major side of the fenestration panel; wherein a first frame-panel junction between the first frame and the first major side of the fenestration panel comprises an airtight seal between the first frame and the first major side of the fenestration panel; wherein a first frame-lite junction between the first frame and a first major surface of the glass lite comprises an airtight seal between the first frame and the first major surface of the glass lite; and wherein a second frame-panel junction between the second frame and the second major side of the fenestration panel comprises a vent between the second frame and the second major side of the fenestration panel at a selected location along the second frame-panel junction, and wherein the vent is configured to pass liquid water through the second frame-panel junction.

In one or more embodiments of the glass lite retention systems described herein, the vent is configured to pass liquid water through the second frame-panel junction under the force of gravity.

In one or more embodiments of the glass lite retention systems described herein, the vent comprises a channel formed in the second frame, wherein the channel extends across the second frame-panel junction.

In one or more embodiments of the glass lite retention systems described herein, the second frame-panel junction comprises a panel seal between the second frame and the second major side of the fenestration panel, wherein the vent comprises a gap in the panel seal of the second frame-panel junction. In one or more embodiments, the panel seal between the second frame and the second major side of the fenestration panel comprises a gasket.

In one or more embodiments of the glass lite retention systems described herein, the system comprises a lite seal between the second frame and a second major surface of the glass lite. In one or more embodiments, the lite seal between the second frame and the second major surface of the glass lite comprises a continuous seal located inward from and extending continuously around the lite perimeter.

In one or more embodiments of the glass lite retention systems described herein, the vent comprises a first vent of a plurality of vents between the second frame and the second major side of the fenestration panel, wherein each vent of the plurality of vents is positioned at a selected location along the second frame-panel junction and is configured to pass liquid water through the second frame-panel junction.

In one or more embodiments of the glass lite retention systems described herein, the first frame-lite junction comprises a first lite seal located between the first frame and the first major surface of the glass lite, wherein the first lite seal extends continuously around a perimeter of the first frame; and the first frame-panel junction comprises a first panel seal located between the first frame and the first major side of the fenestration panel, wherein the first panel seal extends continuously around the perimeter of the first frame outside of the opening perimeter.

In one or more embodiments of the glass lite retention systems including a first lite seal and a first panel seal as described herein, the first lite seal comprises a first lite gasket located between the first frame and the first major surface of the glass lite; and the first panel seal comprises a first panel gasket located between the first frame and the first major side of the fenestration panel.

In one or more embodiments of the glass lite retention systems including a first lite seal and a first panel seal as described herein, the first lite seal comprises a first lite gasket located between the first frame and the first major surface of the glass lite.

In one or more embodiments of the glass lite retention systems including a first lite seal and a first panel seal as described herein, the first lite seal comprises a first wet lite seal located between the first frame and the first major surface of the glass lite; and the first panel seal comprises a first wet panel seal located between the first frame and the first major side of the fenestration panel.

In one or more embodiments of the glass lite retention systems including a first lite seal and a first panel seal as described herein, the first lite seal comprises a first wet lite seal located between the first frame and the first major surface of the glass lite.

In one or more embodiments of the glass lite retention systems including a first lite seal and a first panel seal as described herein, the first frame-lite junction comprises a first auxiliary lite seal located between the first frame and the first major surface of the glass lite, wherein the first auxiliary lite seal extends continuously around a perimeter of the first frame. In one or more embodiments, the first auxiliary lite seal is located inward of the first lite seal such that the first auxiliary lite seal is located between the first lite seal and a lite edge when moving around the perimeter of the first frame.

In one or more embodiments, the first auxiliary lite seal comprises a wet seal. In one or more embodiments in which the first auxiliary lite seal comprises a wet seal, the first lite seal comprises a gasket.

In one or more embodiments of the glass lite retention systems including a first lite seal and a first panel seal as described herein, the first frame-panel junction comprises a first auxiliary panel seal located between the first frame and the first major side of the fenestration panel, wherein the first auxiliary panel seal extends continuously around a perimeter of the first frame. In one or more embodiments, the first auxiliary panel seal is located inward of the first panel seal such that the first auxiliary panel seal is located between the first panel seal and the opening perimeter when moving around the perimeter of the first frame.

In one or more embodiments of the glass lite retention systems described herein, the first auxiliary panel seal comprises a wet seal. In one or more embodiments in which the first auxiliary panel seal comprises a wet seal, the first panel seal comprises a gasket.

In one or more embodiments of the glass lite retention systems described herein, the first frame is attached to the second frame through the junction between the lite perimeter and the opening perimeter.

In a second aspect, one or more embodiments of methods of retaining a glass lite in an opening of a fenestration panel include: locating a glass lite in an opening of a fenestration panel; positioning a first frame on a first major side of the fenestration panel, wherein an inner portion of the first frame is positioned over a portion of a first major surface of the glass lite; positioning a second frame on a second major side of the fenestration panel, wherein an inner portion of the second frame is positioned over a portion of a second major surface of the glass lite such that the glass lite is located between the first frame member and the second frame member; forming an airtight lite seal between the first frame and the first major surface of the glass lite; forming an airtight panel seal between the first frame and the first major side of the fenestration panel; and providing a vent at a selected location in a second frame-panel junction between the second frame and the second major side of the fenestration panel such that liquid water entering the second frame-panel junction above the vent passes out of the second frame-panel junction through the vent.

In one or more embodiments of the methods of retaining a glass lite in an opening of a fenestration panel as described herein, providing the vent comprises forming a channel in the second frame.

In one or more embodiments of the methods of retaining a glass lite in an opening of a fenestration panel as described herein, providing the vent comprises providing a gap in a panel seal formed between the second frame and the second major side of the fenestration panel.

In a third aspect, one or more embodiments of methods of limiting entry of water through a junction between a glass lite and an opening containing the glass lite in a fenestration panel as described herein include: providing a fenestration panel comprising an opening containing a glass lite, the fenestration panel comprising a first major side and a second major side; a first frame positioned on the first major side of the fenestration panel, the first frame positioned over a junction between a lite perimeter of the glass lite and an opening perimeter of the opening containing the glass lite; a second frame positioned on the second major side of the fenestration panel, the second frame positioned over the junction between the lite perimeter and the opening perimeter, wherein the first frame forms an airtight lite seal between the first frame and a first major surface of the glass lite and an airtight panel seal between the first frame and the first major side of the fenestration panel, and a vent between the second frame and the second major side of the fenestration panel at a selected location along the junction between the lite perimeter and the opening perimeter; and installing the fenestration panel in a building opening, wherein the first major surface of the fenestration panel faces an expected low pressure side of the building opening and the second major surface of the fenestration panel face an expected high pressure side of the building opening.

In a fourth aspect, one or more embodiments of a fenestration panel including a glass lite retention system as described herein includes a fenestration panel comprising an opening containing a glass lite, the fenestration panel comprising a first major side and a second major side; a first frame positioned on the first major side of the fenestration panel, the first frame positioned over a junction between a lite perimeter of the glass lite and an opening perimeter of the opening containing the glass lite; a second frame positioned on the second major side of the fenestration panel, the second frame positioned over the junction between the lite perimeter and the opening perimeter; wherein the first frame forms an airtight lite seal between the first frame and a first major surface of the glass lite and an airtight panel seal between the first frame and the first major side of the fenestration panel; and a vent between the second frame and the second major side of the fenestration panel at a selected location along the junction between the lite perimeter and the opening perimeter.

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Further, the term "and/or" means one or all of the listed elements or a combination of any two or more of the listed elements.

It is noted that the term "comprises" and variations thereof do not have a limiting meaning where these terms appear in the accompanying description. Moreover, "a," "an," "the," "at least one," and "one or more" are used interchangeably herein.

The above summary is not intended to describe each embodiment or every implementation of the glass lite retention systems and methods described herein. Rather, a more complete understanding of the invention will become apparent and appreciated by reference to the following Description of Illustrative Embodiments and claims in view of the accompanying figures of the drawing.

BRIEF DESCRIPTION OF THE VIEWS OF THE DRAWING

Each of the figures described herein include axes corresponding to a three-dimensional Cartesian coordinate system to facilitate an understanding of the illustrative embodiments of the invention depicted in the figures and described herein.

DESCRIPTION OF ILLUSTRATIVE EMBODIMENTS

Figure 1:
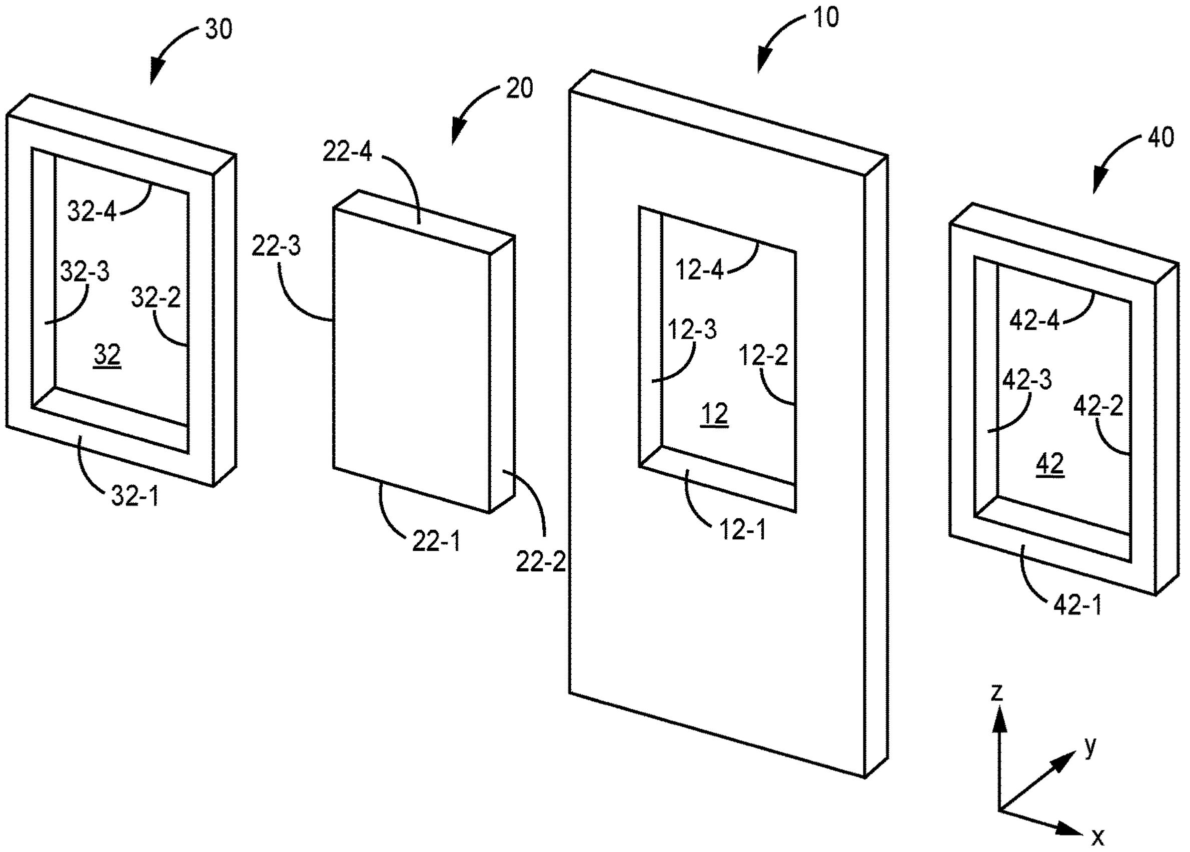
FIG. 1 is an exploded view of one illustrative embodiment of a fenestration panel including an opening configured to receive a glass lite and opposing frames used to retain the glass lite in the opening as described herein.

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

One illustrative embodiment of a glass lite retention system is depicted in FIG. 1 and includes a fenestration panel 10 having an opening 12 formed through the fenestration panel 10. Although the depicted fenestration panel 10 is in the form of a door panel, the glass lite retention systems described herein may be used with any fenestration panel used to retain a glass lite in an opening.

The opening 12 extends through the fenestration panel 10 from a first major side of the fenestration panel to a second major side and includes opening edges 12-1, 12-2, 12-3, 12-4 that, together, define the shape of the opening 12. Although depicted as a rectangular opening, openings in fenestration panels used in glass lite retention systems as described herein may take any suitable shape, where the suitable shapes may be rectilinear or otherwise.

Also depicted in FIG. 1 is a glass lite 20 sized to fit within opening 12 in fenestration panel 10. Glass lite 20 includes lite edges 22-1, 22-2, 22-3, 22-4. In the depicted illustrative embodiment, each lite edge faces an opening edge that defines a portion of the shape of the opening 12 in the fenestration panel 10. In the depicted embodiment, lite edge 22-1 faces opening edge 12-1, lite edge 22-2 faces opening edge 12-2, lite edge 22-3 faces opening edge 12-3, and lite edge 22-4 faces opening edge 12-4. Taken together, the lite edges can be described as defining a lite perimeter. Similarly, taken together, the opening edges can be described as defining an opening perimeter. Further, the lite perimeter and the opening perimeter can be described as meeting at a junction when the glass lite 20 is positioned in the opening 12.

Although described as a glass lite, the glass lite may include one or more panels constructed from glass and/or polymers with, in one or more embodiments, cavities formed between one or more adjacent pairs of the panels forming the glass lite.

The illustrative embodiment of the glass lite system depicted in FIG. 1 also includes a pair of frames 30 and 40 configured to be positioned on opposite sides of the fenestration panel 10 as well as opposite sides of the glass lite 20. The frames 30 and 40, when attached to the fenestration panel 10 surrounding opening 12 assist in retaining the glass lite 20 in opening 12.

In one or more embodiments, the frames 30 and 40 may be constructed of any suitable material with potentially suitable materials including, but not limited to, thermoset materials (e.g., polyester, silicone, polyurethane, etc.), thermoplastic materials (e.g., acrylonitrile butadiene styrene (ABS), polycarbonate, polyethylene, polyvinylchloride (PVC), etc.). In some embodiments, the frames may be provided as composites including one or more materials, fillers, etc. to improve dimensional stability and/or other characteristics. In one or more embodiments, it may be preferred that the frames 30 and 40 have a one-piece construction such that no joints between separate and discrete pieces are provided to form the frame.

In the depicted illustrative embodiment, frame 30 is positioned on a first major side of the fenestration panel 10 and includes frame members 32-1, 32-2, 32-3, 32-4 that, together, define the shape of the frame 30. When assembled, each of the frame members is positioned over a junction between each lite edge of the glass lite and each opening edge facing the respective lite edge. For example, frame member 32-1 is positioned over a junction between lite edge 22-1 and opening edge 12-1.

Also in the depicted illustrative embodiment, frame 40 is positioned on a second major side of the fenestration panel 10 and includes frame members 42-1, 42-2, 42-3, 42-4 that, together, define shape of the frame 40. When assembled each of the frame members is positioned over a junction between each lite edge of the glass lite 20 and each opening edge of opening 12 facing the respective lite edge. For example, frame member 42-1 is positioned over a junction between lite edge 22-1 and opening edge 12-1.

In the depicted illustrative embodiment, the frame 30 is attached to the frame 40 through the junctions between the lite edges of the glass lite 20 and the opening edges of the opening 12 in fenestration panel 10.

In one or more illustrative embodiments of the glass lite retention systems described herein, a frame-lite junction between the frame 40 and the surface of the glass lite 20 against which the frame 40 is positioned forms an airtight seal between the frame 40 and the surface of the glass lite 20. In addition, the frame-panel junction between the frame 40 and the major side of the fenestration panel 10 surrounding the opening 12 also, in one or more embodiments, forms an airtight seal between the frame 40 and the major side of the fenestration panel 10.

As used herein, the term "airtight seal" describes an interface between the respective components that is configured to restrict, and preferably prevent, the passage of air and liquid water through the interface. As discussed herein, the airtight seal provided between frame 40 and the major side of the fenestration panel 10 is positioned on the side of the fenestration panel 10 expected to be facing a lower pressure/interior environment.

In one or more illustrative embodiments of the glass lite retention systems described herein, a frame-panel junction between the frame 30 and the major side of the fenestration panel 10 against which the frame 30 is positioned includes a vent between the frame 30 and the major side of the fenestration panel 10 such that the frame-panel junction formed between frame 30 and the major side of the fenestration panel 10 is configured to pass liquid water out of the frame-panel junction. As a result, water located between the frame 30 and the second major side of the fenestration panel 10 can escape the frame-panel junction through the vent between the frame 30 and the major side of the fenestration panel 10. As discussed herein, the vented interface provided between frame 30 and the major side of the fenestration panel 10 is positioned on the side of the fenestration panel 10 expected to be facing a higher pressure/exterior environment.

Although it may be preferred that the frame-panel junction between the frame 30 and the major side of the fenestration panel 10 against which the frame 30 is positioned includes a vent, in one or more embodiments of the glass lite retention systems described herein a frame-lite junction between the frame 30 and the surface of the glass lite 20 against which the frame 30 is positioned forms an airtight seal between the frame 30 and the surface of the glass lite 20.

The vent provided in the frame-panel junction between the frame 30 and the major side of the fenestration panel 10 is preferably configured to pass liquid water out of the frame-panel junction between frame 30 and the fenestration panel under the force of gravity. As a result, in one or more embodiments, the vent may preferably be located along the lowest frame member 32-1 positioned over the junction between the lowest opening edge 12-1 and corresponding lite edge 22-1.

Although described as a vent, the frame-panel junction between the frame 30 and the fenestration panel 10 may include two or more discrete vents positioned along the bottom of the junction between the lowest opening edge 12-1 and the corresponding lite edge 22-1. In one or more alternative embodiments where, for example, the lowest opening edge and corresponding lite edge are curved, the vent may preferably be located at the lowest spot along the curve to facilitate the flow of water out of the frame-panel junction under the force of gravity.

Figure 2:
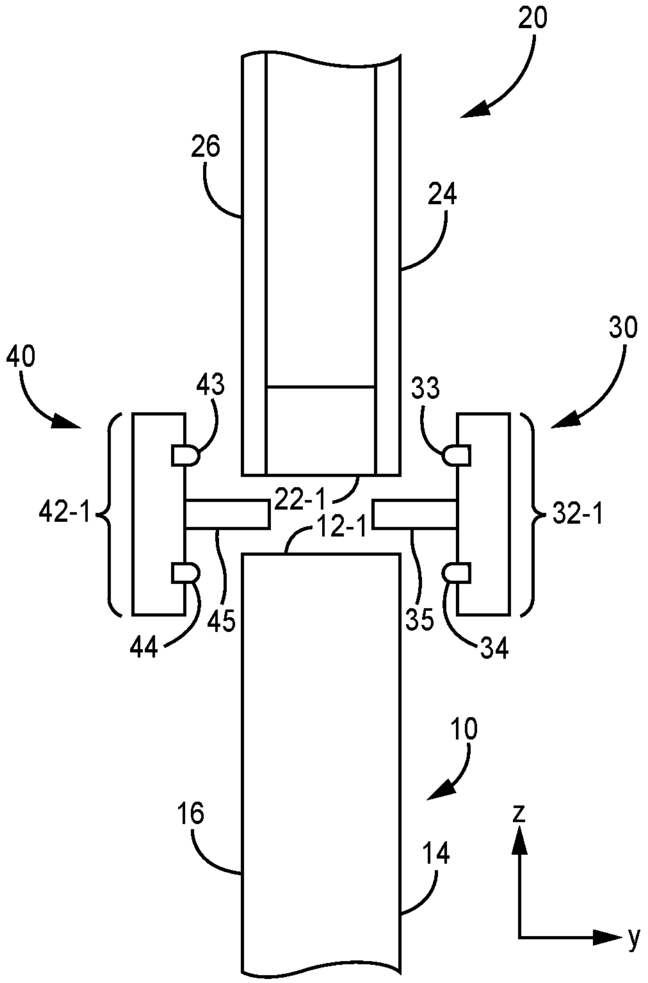
FIG. 2 is an enlarged exploded cross-sectional view (in the Z-Y plane) of the illustrative embodiment depicted in FIG. 1 taken along the bottom edge of the junction between the glass lite and the fenestration panel opening.

A cross-sectional view of the junction between the fenestration panel 10 and glass lite 20 is depicted in FIG. 2, with the cross-sectional view being taken in the Y-Z plane along the lowest frame members 32-1 and 42-1 of the frames 30 and 40, respectively. As a result, the lowest lite edge 22-1 of glass lite 20 faces the lowest panel edge 12-1 of fenestration panel 10.

As seen in FIG. 2, the depicted illustrative embodiment of frame member 32-1 includes a lite seal 33 and a panel seal 34, with the lite seal 33 being positioned to bear against the major surface 24 of glass lite 20 and panel seal 34 being positioned to bear against the major side 14 of the fenestration panel 10 when connected to the frame 40 to retain glass lite 20 in the opening 12 in fenestration panel 10.

Also seen in FIG. 2, the depicted illustrative embodiment of frame member 42-1 includes a lite seal 43 and a panel seal 44, with the lite seal 43 being positioned to bear against the major surface 26 of glass lite 20 and panel seal 44 being positioned to bear against the major side 16 of the fenestration panel 10 when connected to the frame 30 to retain glass lite 20 in the opening 12 and fenestration panel 10.

FIG. 2 also depicts one set of screw bosses 35 and 45 that can, in one or more embodiments, be used to attach the frame 32 the frame 40 through the junction between the glass lite 20 and opening 12 in fenestration panel 10. Other structures capable of attaching the frames 30 and 40 together through the glass lite-opening junctions may also be used in place of or in addition to screw bosses.

Figure 3:
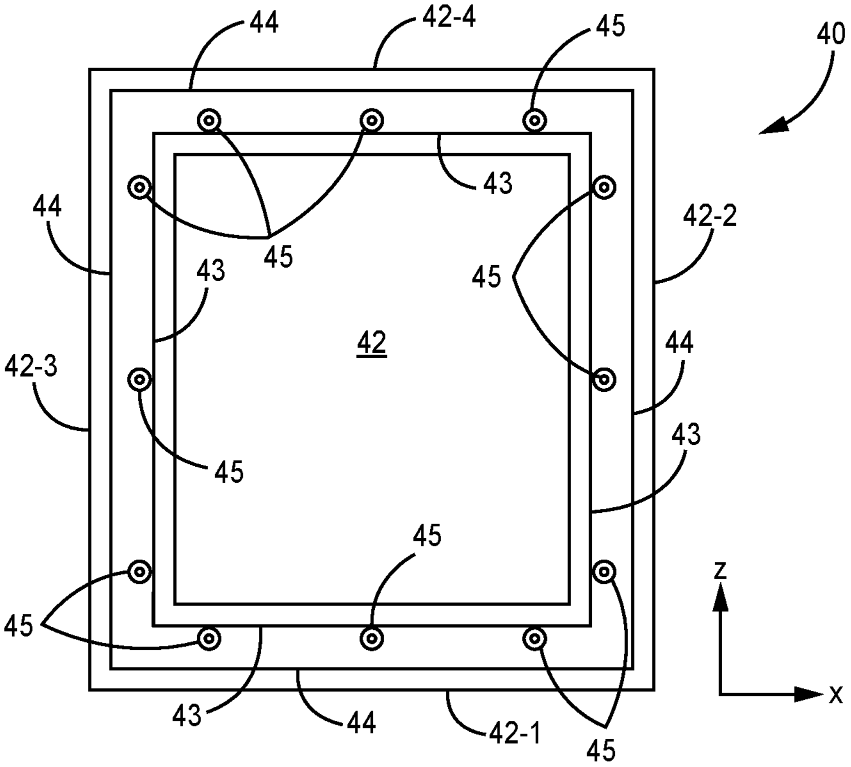
FIG. 3 is a plan view of one of the frames depicting features facing the glass lite and the fenestration panel when assembled to retain the glass lite in the opening.

FIG. 3 depicts the surface of the frame 40 facing the major side 16 of the fenestration panel 10 and the major surface 26 of the glass lite 20. Frame 40 includes frame members 42-1, 42-2, 42-3, 42-4 surrounding and defining opening 42 in frame 40. Screw bosses 45 are also depicted around the perimeter of the frame 40. Also depicted in FIG. 3 are lite seal 43 and panel seal 44 as seen in FIG. 2. In one or more embodiments, the lite seal 43 and panel seal 44 preferably extend continuously around a perimeter of the frame 40.

In one or more embodiments, the lite seal 43 may be provided in the form of a wet seal or a gasket. In one or more embodiments, the panel seal 44 may be provided in the form of a wet seal or a gasket. Regardless of their construction (e.g., wet seal, gasket, combination of wet seal and gasket, etc.), the lite seal 43 and the panel seal 44 are preferably configured to form an airtight seal between the frame 40 and the glass lite 20 and also form an airtight seal between the frame 40 and the fenestration panel 10 as described herein such that the frame-panel junction and the frame-lite junction are both airtight seals.

As used herein, the term "wet seal" (and variations thereof) is used to describe seals formed using flowable materials such as, but not limited to, silicones (e.g., RTV (room temperature vulcanizing) silicones, hot melt silicones, etc.) hot melts, urethanes, polyurethanes, polyamides, polyvinyl acetates, polyethers, hybrid reactive chemistries, etc. (including combinations thereof). The flowable materials may, in some embodiments, be characterized as adhesives and/or sealants.

As used herein, the term "gasket" (and variations thereof) is used to describe seals formed using discrete bodies or structures that are not flowable. Gasket materials that may be used in the glass lite retention systems described herein can include, but are not limited to, foams of various shapes and materials, single and dual sided adhesive tapes of various materials and constructions (e.g. adhesive/foam/adhesive constructions such as VHB™ tape sold by 3M Company, etc.) as well as the following materials: Themoplastic Elastomers (TPE) (e.g., Styrenic block copolymers, TPS (TPE-s); Thermoplastic polyolefinelastomers, TPO (TPE-o); Thermoplastic Vulcanizates, TPV (TPE-v or TPV); Thermoplastic polyurethanes, TPU (TPU); Thermoplastic copolyester, TPC (TPE-E); Thermoplastic polyamides, TPA (TPE-A); etc.); Thermosetting Elastomers (e.g., Natural Rubbers; Silicone Synthetic Rubbers; Neoprene Synthetic Rubbers; Nitrile Synthetic Rubbers; Styrene Butadiene Synthetic Rubbers; Ehtylene Propylene Diene Monomer Synthetic Rubbers (EPDM); Fluoroelastomers Synthetic Rubbers (FKM); Vinyl Methyl Silicone Rubber (VMS); Fluorosilicone Synthetic Rubber; etc.); and others. Copolymers of the above and/or foamed versions of the materials could also be used.

In one or more embodiments, seals formed using gaskets may be described as dry glazing seals in which the shape of the gasket material is set before the frame on which the gasket is carried is contacted with the glass lite 20 or fenestration panel 10. As a result, gaskets may, in one or more embodiments, be formed of materials that may be suitable for use as a wet seal as described herein, with that material being deposited, extruded, etc. in place on the frame and allowed to set, cure, dry, etc. before the frames are assembled to retain a glass lite in an opening in a fenestration panel as described herein.

Figure 4:
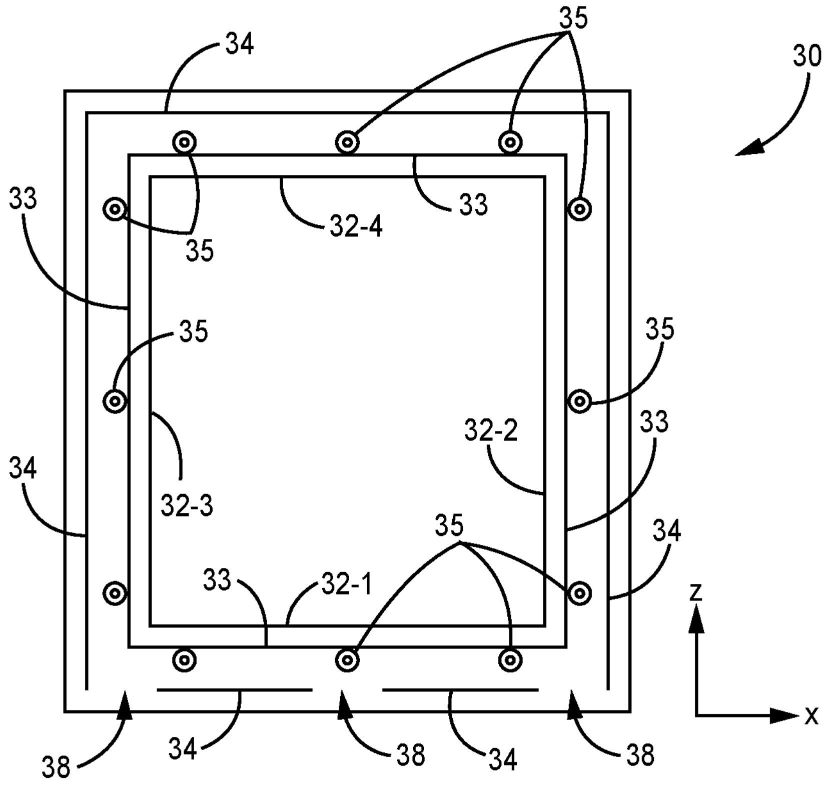
FIG. 4 is a plan view of the opposing frame depicting features facing the glass lite and the fenestration panel when assembled to retain the glass lite in the opening.

FIG. 4 depicts the surface of the frame 30 facing the major side 16 of the fenestration panel 10 and the major surface 24 of the glass lite 20. Frame 30 includes frame members 32-1, 32-2, 32-3, 32-4 surrounding and defining opening 32 in frame 30. Screw bosses 35 are also depicted around the perimeter of the frame 30. Also depicted in FIG. 4 are lite seal 33 and panel seal 34 as seen in FIG. 2. In one or more embodiments, the lite seal 33 preferably extends continuously around a perimeter of the frame 30. Regardless of its construction (e.g., wet seal, gasket, combination of wet seal and gasket, etc.), the lite seal 33 is preferably configured to form an airtight seal between the frame 30 and the glass lite 20.

Unlike panel seal 44 on frame 40, panel seal 34 as depicted in the illustrative embodiment seen in FIG. 4 includes at least one vent 38 that is configured to pass liquid water out of the frame-panel junction as described herein. In the embodiment depicted in FIG. 4, panel seal 34 extends around a majority of the perimeter of frame 30. In particular, panel seal 34 extends along the length of the uppermost frame member 32-4 as well as down the side members 32-2 and 32-3. Although not required to extend fully along frame members 32-2, 32-3 and 32-4 may limit the amount of water entering the frame-panel junction.

The depicted embodiment of frame 30 includes three vents 38 separated by portions of panel seal 34. In one or more embodiments, vents 38 may be formed by removing portions of panel seal 34 after those portions of panel seal 34 have been applied in the locations of vents 38. In one or more alternative embodiments, vents 38 may be formed by failing to position any sealing material or structure within the area occupied by vents 38. The depicted arrangement of vents 38 is only one embodiment of many possible alternatives. Further, the size of the vents can vary. In one alternative embodiment, for example, a vent could occupy the entire length of the bottom frame member 32-1.

Figure 5:
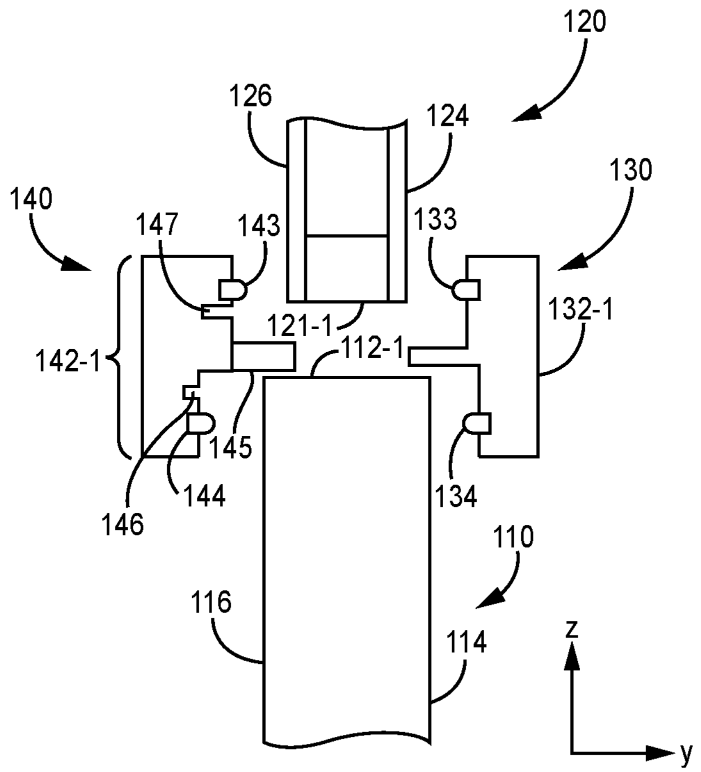
FIG. 5 is a cross-sectional view (in the Z-Y plane) of another illustrative embodiment of a glass lite retention system as described herein depicting a junction between the glass lite and the fenestration panel opening.

Another illustrative embodiment of a glass lite retention system as described herein is depicted in a cross-sectional view in FIG. 5. The glass lite retention system includes frames 130 and 140 located on opposite sides of a glass lite 120 and fenestration panel 110. Lite edge 122-1 faces opening edge 112-1 in fenestration panel 110.

As seen in FIG. 5, the depicted illustrative embodiment of frame member 132-1 includes a lite seal 133 and a panel seal 134, with the lite seal 133 being positioned to bear against the major surface 124 of glass lite 120 and panel seal 134 being positioned to bear against the major side 114 of the fenestration panel 110 when connected to the frame 140 to retain glass lite 120 in the opening in fenestration panel 110.

The depicted illustrative embodiment of frame member 142-1 includes a lite seal 143 and a panel seal 144, with the lite seal 143 being positioned to bear against the major surface 126 of glass lite 120 and panel seal 144 being positioned to bear against the major side 116 of the fenestration panel 110 when connected to the frame 130 to retain glass lite 120 in the opening 112 and fenestration panel 110.

Frame member 142-1 also includes channels 146 and 147, both of which may be configured to receive an auxiliary seal in the form of a gasket and/or flowable material configured to form a wet seal as described herein. In one or more embodiments, the channels 146 and 147 preferably extend around the entire perimeter of the frame 140 such that auxiliary seals formed by placing a gasket and/or flowable material into the channels can assist in forming the airtight seal between the frame 140 and the major surface 126 of glass lite 120 along with the major side 116 of fenestration panel 110.

In one or more embodiments, it may be preferred that flowable materials configured to form an auxiliary seal in the form of a wet seal be provided in channels 146 and 147 with the lite seal 143 and panel seal 144 being provided in the form of preformed gaskets. In such an arrangement, the lite seal 143 and panel seal 144 may assist in preventing leakage of the flowable materials used to form the auxiliary wet seals in channels 146 and 147 out of the interfaces between the frame 140 and the glass lite 120 as well as the fenestration panel 110.

Figure 6:
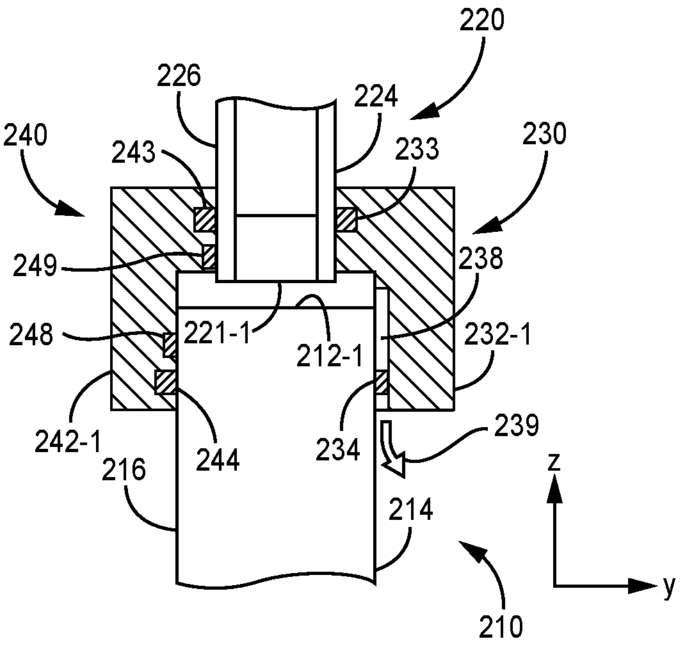
FIG. 6 is an exploded partial cross-sectional view (in the Z-Y plane) of another illustrative embodiment of a glass lite retention system as described herein depicting channels configured to receive an auxiliary seal as described herein.

Another illustrative embodiment of a glass lite retention system as described herein is depicted in a cross-sectional view in FIG. 6. The glass lite retention system includes frames 230 and 240 located on opposite sides of a glass lite 220 and fenestration panel 210. Lite edge 222-1 faces opening edge 212-1 in fenestration panel 210.

As seen in FIG. 6, the depicted illustrative embodiment of frame member 232-1 includes a lite seal 233 and a panel seal 234, with the lite seal 233 being positioned to bear against the major surface 224 of glass lite 220 and panel seal 234 being positioned to bear against the major side 214 of the fenestration panel 210 when connected to the frame 240 to retain glass lite 220 in the opening in fenestration panel 210.

The depicted illustrative embodiment of frame member 242-1 includes a lite seal 243 and a panel seal 244, with the lite seal 243 being positioned to bear against the major surface 226 of glass lite 220 and panel seal 244 being positioned to bear against the major side 216 of the fenestration panel 210 when connected to the frame 230 to retain glass lite 220 in the opening 212 and fenestration panel 210.

Also depicted in FIG. 6 are auxiliary wet seals 248 and 249 located in between frame 240 and glass lite 220 as well as fenestration panel 210. In particular, auxiliary wet seal 248 is located in the frame-panel junction between frame 240 and the major side 216 of fenestration panel 210, while auxiliary wet seal 249 is located in the frame-lite junction between frame 240 and the major surface 226 of glass lite 220. One or both of the auxiliary wet seals 248 and 249 may assist in providing an airtight seal at both the frame-panel junction between frame 240 and fenestration panel 210 as well as at the frame-lite junction between frame 240 and glass lite 220.

In embodiments including auxiliary wet seals 248 and 249, it may be preferred that the lite seal 243 and panel seal 244 be provided as dry seals formed by gaskets that can assist in preventing leakage of the flowable materials used to form the auxiliary wet seals out of the interface between the frame 240 and the glass lite 220 as well as fenestration panel 210.

Another feature that may be found in one or more embodiments of glass lite retention systems as described herein is depicted in FIG. 6. In particular, the additional feature is a vent 238 formed in the frame-panel interface between frame member 232-1 and major side 214 of fenestration panel 210. As discussed herein, the vents provided at the frame-panel junctions of one or more embodiments of glass lite retention systems as described herein are configured to pass liquid water out of the frame-panel junction.

Although the vents provided along the frame-panel junctions as described herein may take a variety of forms (including, for example, the absence of a gasket or wet seal at one or more selected locations), in one or more embodiments, the vent 238 may be provided as a channel formed into the frame 230 along frame member 232-1.

Figure 7:
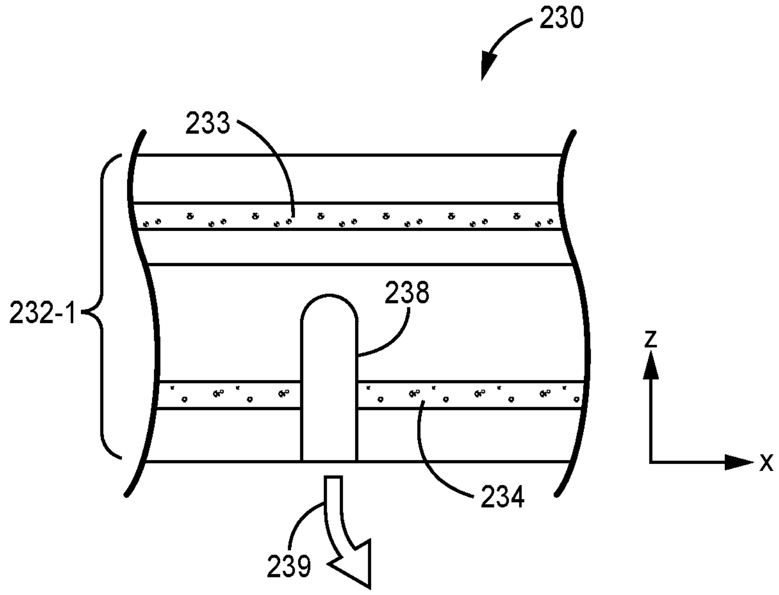
FIG. 7 is an enlarged view of one illustrative embodiment of a vent that may be provided in a glass lite retention system as described herein.

With reference to FIG. 7, the channel forming vent 238 may preferably extend across the panel seal 234. In one or more embodiments, the vent 238 may preferably leave the lite seal 233 of frame 230 intact. In one or more embodiments, vents formed using channels may be provided by removing material from the frame member 232-1. Removal of the material from the frame member 232-1 may also include removing a portion of the material used to form panel seal 234 which may already be present on the frame 230. Removal of the material of frame member 232-1 and/or panel seal 234 may involve milling, cutting, grinding, ablation, etc. In one or more alternative embodiments, one or more vents may be formed in the frames as manufactured through, e.g., molding, casting, etc. In still other embodiments, one or more vents may be formed by deforming the frames through, e.g., stamping, etc.

The complete disclosure of the patents, patent documents, and publications identified herein are incorporated by reference in their entirety as if each were individually incorporated. To the extent there is a conflict or discrepancy between this document and the disclosure in any such incorporated document, this document will control.

Illustrative embodiments of glass lite retention systems and methods are discussed herein with some possible variations described. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof. It should also be understood that this invention also may be suitably practiced in the absence of any element not specifically disclosed as necessary herein.

The invention claimed is:

1. A glass lite retention system comprising:

a fenestration panel comprising an opening formed through the fenestration panel, the opening extending through the fenestration panel from a first major side of the fenestration panel to a second major side of the fenestration panel, the opening comprising an opening perimeter defining a shape of the opening;

a glass lite positioned in the opening;

a first frame positioned on the first major side of the fenestration panel, the first frame comprising one or more first frame members defining a shape of the first frame, wherein the first frame is positioned over a junction between a lite perimeter of the glass lite and the opening perimeter on the first major side of the fenestration panel; and a second frame positioned on the second major side of the fenestration panel, the second frame comprising one or more second frame members defining a shape of the second frame, wherein the second frame is positioned over the junction between the lite perimeter and the opening perimeter on the second major side of the fenestration panel;

wherein a first frame-panel junction between the first frame and the first major side of the fenestration panel comprises an airtight panel seal between the first frame and the first major side of the fenestration panel;

wherein a first frame-lite junction between the first frame and a first major surface of the glass lite comprises an airtight lite seal between the first frame and the first major surface of the glass lite; and wherein a second frame-panel junction between the second frame and the second major side of the fenestration panel comprises a vent between the second frame and the second major side of the fenestration panel at a selected location along the second frame-panel junction, and wherein the vent is configured to pass liquid water through the second frame-panel junction.

2. The glass lite retention system according to claim 1, wherein the vent is configured to pass liquid water through the second frame-panel junction under the force of gravity.

3. The glass lite retention system according to claim 1, wherein the vent comprises a channel formed in the second frame, wherein the channel extends across the second frame-panel junction.

4. The glass lite retention system according to claim 1, wherein the vent comprises a first vent of a plurality of vents between the second frame and the second major side of the fenestration panel, wherein each vent of the plurality of vents is positioned at a selected location along the second frame-panel junction and is configured to pass liquid water through the second frame-panel junction.

5. The glass lite retention system according to claim 1, wherein the first frame is attached to the second frame through the junction between the lite perimeter and the opening perimeter.

6. The glass lite retention system according to claim 1, wherein the second frame-panel junction comprises a panel seal between the second frame and the second major side of the fenestration panel, wherein the vent comprises a gap in the panel seal of the second frame-panel junction.

7. The glass lite according to claim 6, wherein the panel seal between the second frame and the second major side of the fenestration panel comprises a gasket.

8. The glass lite according to claim 1, further comprising a lite seal between the second frame and a second major surface of the glass lite.

9. The glass lite according to claim 8, wherein the lite seal between the second frame and the second major surface of the glass lite comprises a continuous seal located inward from and extending continuously around the lite perimeter.

10. The glass lite retention system according to claim 1, wherein the first frame-lite junction comprises a first lite seal located between the first frame and the first major surface of the glass lite, wherein the first lite seal extends continuously around a perimeter of the first frame; and wherein the first frame-panel junction comprises a first panel seal located between the first frame and the first major side of the fenestration panel, wherein the first panel seal extends continuously around the perimeter of the first frame outside of the opening perimeter.

11. The glass lite retention system according to claim 10, wherein the first lite seal comprises a first lite gasket located between the first frame and the first major surface of the glass lite; and wherein the first panel seal comprises a first panel gasket located between the first frame and the first major side of the fenestration panel.

12. The glass lite retention system according to claim 10, wherein the first lite seal comprises a first lite gasket located between the first frame and the first major surface of the glass lite.

13. The glass lite retention system according to claim 10, wherein the first lite seal comprises a first wet lite seal located between the first frame and the first major surface of the glass lite; and wherein the first panel seal comprises a first wet panel seal located between the first frame and the first major side of the fenestration panel.

14. The glass lite retention system according to claim 10, wherein the first lite seal comprises a first wet lite seal located between the first frame and the first major surface of the glass lite.

15. The glass lite retention system according to claim 10, wherein the first frame-lite junction comprises a first auxiliary lite seal located between the first frame and the first major surface of the glass lite, wherein the first auxiliary lite seal extends continuously around a perimeter of the first frame.

16. The glass lite retention system according to claim 15, wherein the first auxiliary lite seal is located inward of the first lite seal such that the first auxiliary lite seal is located between the first lite seal and a lite edge when moving around the perimeter of the first frame.

17. The glass lite retention system according to claim 10, wherein the first frame-panel junction comprises a first auxiliary panel seal located between the first frame and the first major side of the fenestration panel, wherein the first auxiliary panel seal extends continuously around a perimeter of the first frame.

18. The glass lite retention system according to claim 17, wherein the first auxiliary panel seal is located inward of the first panel seal such that the first auxiliary panel seal is located between the first panel seal and the opening perimeter when moving around the perimeter of the first frame.

19. A method of retaining a glass lite in an opening of a fenestration panel utilizing the glass lite retention system of claim 1, the method comprising:

locating a glass lite in an opening of a fenestration panel;

positioning a first frame on a first major side of the fenestration panel, wherein an inner portion of the first frame is positioned over a portion of a first major surface of the glass lite;

positioning a second frame on a second major side of the fenestration panel, wherein an inner portion of the second frame is positioned over a portion of a second major surface of the glass lite such that the glass lite is located between the first frame member and the second frame member;

forming an airtight lite seal between the first frame and the first major surface of the glass lite; forming an airtight panel seal between the first frame and the first major side of the fenestration panel; and providing a vent at a selected location in a second frame-panel junction between the second frame and the second major side of the fenestration panel such that liquid water entering the second frame-panel junction above the vent passes out of the second frame-panel junction through the vent.

20. The method according to claim 19, wherein providing the vent comprises forming a channel in the second frame.

21. The method according to claim 19, wherein providing the vent comprises providing a gap in a panel seal formed between the second frame and the second major side of the fenestration panel.

22. A method of limiting entry of water through a junction between a glass lite and an opening containing the glass lite in a fenestration panel utilizing the glass lite retention system of claim 1, the method comprising:

providing a fenestration panel comprising an opening containing a glass lite, the fenestration panel comprising a first major side and a second major side; a first frame positioned on the first major side of the fenestration panel, the first frame positioned over a junction between a lite perimeter of the glass lite and an opening perimeter of the opening containing the glass lite; a second frame positioned on the second major side of the fenestration panel, the second frame positioned over the junction between the lite perimeter and the opening perimeter, wherein the first frame forms an airtight lite seal between the first frame and a first major surface of the glass lite and an airtight panel seal between the first frame and the first major side of the fenestration panel, and a vent between the second frame and the second major side of the fenestration panel at a selected location along the junction between the lite perimeter and the opening perimeter; and installing the fenestration panel in a building opening, wherein the first major surface of the fenestration panel faces an expected low pressure side of the building opening and the second major surface of the fenestration panel face an expected high pressure side of the building opening.

* * * * *